(12) United States Patent
Go et al.

(10) Patent No.: US 9,638,569 B2
(45) Date of Patent: May 2, 2017

(54) LIQUID LEVEL DETECTOR

(71) Applicant: Aisan Kogyo Kabushiki Kaisha, Obu-shi (JP)

(72) Inventors: Masashi Go, Chita-gun (JP); Nobuo Suzuki, Obu (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 91 days.

(21) Appl. No.: 14/695,201

(22) Filed: Apr. 24, 2015

(65) Prior Publication Data

US 2015/0308881 A1  Oct. 29, 2015

(30) Foreign Application Priority Data

Apr. 25, 2014  (JP) ................. 2014-091033

(51) Int. Cl.
*G01F 23/38* (2006.01)

(52) U.S. Cl.
CPC .................. *G01F 23/38* (2013.01)

(58) Field of Classification Search
CPC ..................................... G01F 23/38
See application file for complete search history.

(56) References Cited

U.S. PATENT DOCUMENTS

2008/0072668 A1\* 3/2008 Miyagawa ............ G01F 23/363
                                                                    73/319

FOREIGN PATENT DOCUMENTS

| JP | 2001-124615 A | 5/2001 |
| JP | 2006-208212 A | 8/2006 |
| JP | 2010-048780 A | 3/2010 |
| JP | 5169478 B2 | 3/2013 |

OTHER PUBLICATIONS

Korean Office Action with English translation for Korean Patent Application No. 10-2015-0039906 mailed on Dec. 15, 2015 (7 pages).

\* cited by examiner

*Primary Examiner* — Paul West
*Assistant Examiner* — Mark A Shabman
(74) *Attorney, Agent, or Firm* — Shumaker, Loop & Kendrick, LLP (57) ABSTRACT

A liquid level detector may comprise an arm attached to a float, a holder fixed to the arm, and a body rotatably supporting the holder. The body may comprise a first rotation regulator and a second rotation regulator. The first rotation regulator may regulate a rotation angle range of the arm to a first range. The second rotation regulator may regulate the rotation angle range of the arm to a second range. The first range and the second range may not overlap each other in a rotation direction of the arm. Each of the plurality of rotation regulators may comprise a pair of stoppers disposed separately from each other in the rotation direction of the arm. At least a part of area between the pair of stoppers of the each of the plurality of rotation regulators may be open to outside of the body.

8 Claims, 7 Drawing Sheets

LIQUID LEVEL DETECTOR

CROSS-REFERENCE TO RELATED APPLICATION

This application claims priority to Japanese Patent Application No. 2014-091033 filed on Apr. 25, 2014, the contents of which are hereby incorporated by reference into the present application.

TECHNICAL FIELD

Disclosed are liquid level detectors configured to detect a level of liquid (for example, a device configured to detect an amount of fuel stored in a fuel tank of an automobile or the like).

DESCRIPTION OF RELATED ART

Japanese Patent Application Publication No. 2006-208212 A discloses a liquid level detector including: a float configured to move up and down depending on a liquid level; a rotary arm configured to rotate along with the movement of the float; a body provided with a rotating shaft of the rotary arm; and a magnet holder held to be rotatable with respect to the body. The rotating arm is fixed to the magnet holder. The body has two groove portions formed therein. The two groove portions have different lengths along the rotational trajectory of a first end of the rotary arm opposite to a second end of the rotary arm to which the float is attached. Insertion of a projection portion of the magnet holder into either of the two groove portions causes a movement of the first end of the rotary arm to be regulated by wall surfaces formed at both ends of that groove portion. There is a difference in rotation angle range of the rotary arm between a case where the projecting portion of the magnet holder is inserted in one of the groove portions and a case where the projecting portion of the magnet holder is inserted in the other of the groove portions.

SUMMARY

In the art described above, the grooves are formed in the body in order to regulate the rotation angle range of the arm. For this reason, the body is large in size.

The present specification provides a technology that makes it possible to reduce the size of a body having a rotation regulator configured to regulate the rotation of an arm.

The present application discloses a liquid level detector. The liquid level detector may comprise a float; an arm attached to the float and configured to convert a linear motion of the float in an up-and-down direction to a rotary motion; a holder fixed to the arm; and a body rotatably supporting the holder. The body may comprise a plurality of rotation regulators including a first rotation regulator and a second rotation regulator, the first rotation regulator configured to regulate a rotation angle range of the arm to a first range and the second rotation regulator configured to regulate the rotation angle range of the arm to a second range. The holder may be supported by the body in a state where the rotation angle range of the arm is to be regulated by the one of the plurality of rotation regulators. The rotation angle range of the first range may be different from the rotation angle range of the second range. The first range and the second range may not overlap each other in a rotation direction of the arm. Each of the plurality of rotation regulators may comprise a pair of stoppers disposed separately from each other in the rotation direction of the arm. At least a part of area between the pair of stoppers of the each of the plurality of rotation regulators may be open to outside of the body.

In the liquid level detector described above, the outside of the pair of stoppers is open. This makes it unnecessary to form a side wall at the outer side of the rotation regulators, unlike in the case of a liquid level detector including a rotation regulator having a groove shape. This, as a result, the size of the body may be reduced.

DETAILED DESCRIPTION

Some features of embodiments described herein will be listed. Notably, technical features described herein are each independent technical elements, and exhibit technical usefulness thereof solely or in combinations.

(Feature 1) In the liquid level detector, the plurality of rotation regulators may include a third rotation regulator configured to regulate the rotation angle range of the arm to a third range. The rotation angle range of the third range may be different from the rotation angle range of the first range. At least a part of the third range may overlap at least a part of the first range in the rotation direction of the arm. If angle ranges of a plurality of rotation regulators are disposed without overlapping each other in a rotation direction of the arm, the sum of the angle ranges of the plurality of rotation regulators will be equal to or smaller than 360°. On the other hand, the configuration described above makes it possible to make the sum of the angle ranges of the plurality of rotation regulators larger than 360°.

(Feature 2) In the liquid level detector, each of the stoppers may be configured to stop the arm from rotating with respect to the body by contacting at least one of the arm and a contacting portion of the holder. According to, this configuration, the rotation of the arm may be appropriately regulated.

(Feature 3) In the liquid level detector, the plurality of rotation regulators may include a fourth rotation regulator configured to regulate the rotation angle range of the arm to a fourth range. The fourth rotation regulator and the first rotation regulator may be disposed in plane symmetry with respect to a plane encompassing a rotation center of the arm and orthogonal to a rotation plane. According to, this configuration, the degree of freedom of a way in which the arm is supported by the holder may be increased.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved liquid level detectors, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

First Embodiment

Figure 1:
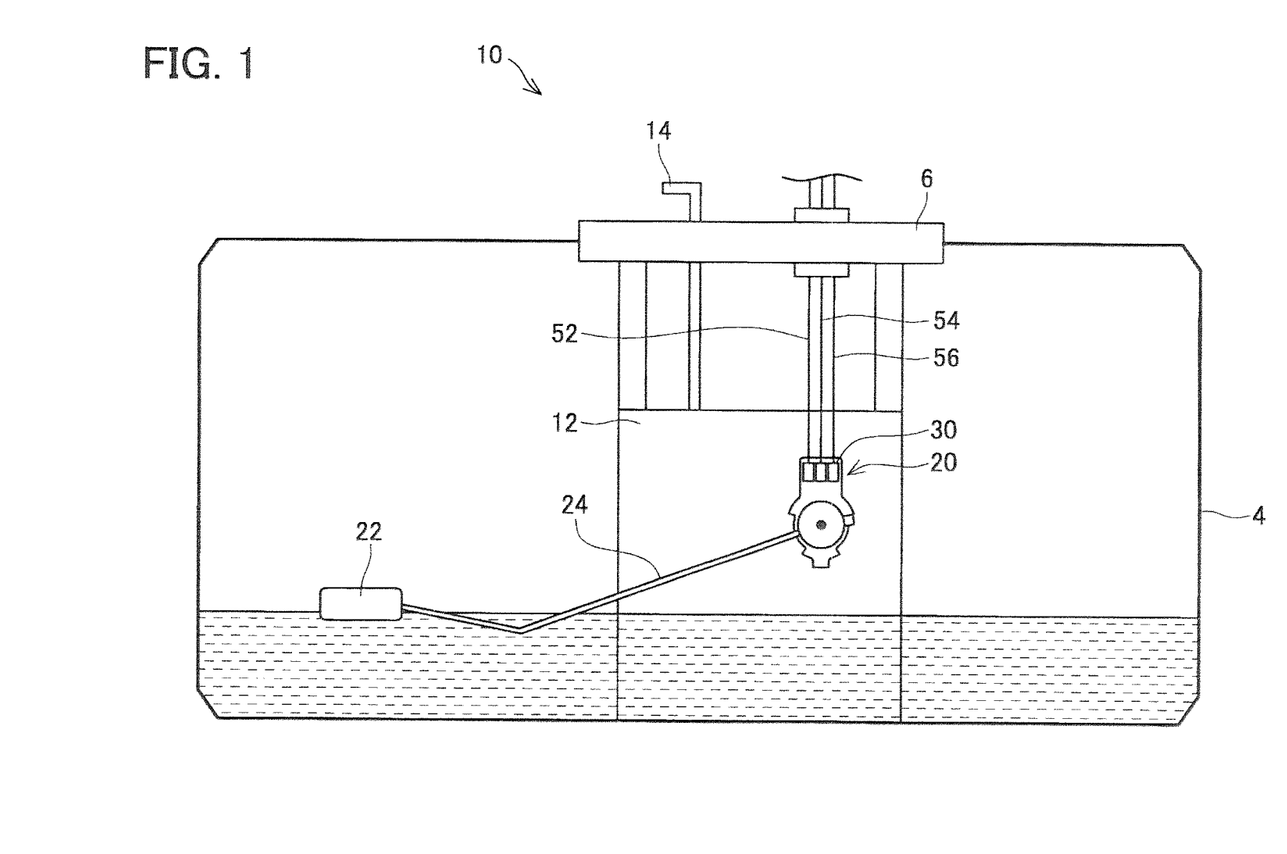
FIG. 1 shows a configuration of a fuel pump module.

As shown in FIG. 1, a fuel pump module 10 is a unit configured to supply, to an engine (not illustrated), fuel in a fuel tank 4 mounted in a vehicle such as an automobile. The fuel pump module 10 is placed in the fuel tank 4.

The fuel pump module 10 includes a fuel pump unit 12 and a fuel amount detector 20. The fuel pump unit 12 is housed in the fuel tank 4. The fuel pump unit 12 is attached to a set plate 6 configured to close an opening in the fuel tank 4. The fuel pump unit 12 sucks in the fuel in the fuel tank 4, pressurizes the fuel thus sucked in, and discharges the fuel. The fuel discharged from the fuel pump unit 12 is supplied to the engine through a discharge port 14.

The fuel amount detector 20 includes a float 22, an arm 24 to which the float 22 is fixed, and a magnetic sensor unit 30 configured to detect a rotation angle of the arm 24. The float 22 floats on the surface of the fuel in the fuel tank 4 and moves up and down depending on the liquid level of the fuel. The float 22 is rotatably attached to a leading end of the arm 24. A base end of the arm 24 is supported to be rotatable with respect to the magnetic sensor unit 30. For this reason, when the float 22 moves up and down depending on the liquid level of the fuel in the fuel tank 4, the arm 24 thereby swingably rotates with respect to the fuel pump unit 12.

The arm 24 is made of a metal, such as stainless steel, that has resistance to the fuel. The arm 24 is made by bending a columnar rod-like member at an intermediate position. The float 22 is attached to the leading end of the arm 24. The base end of the arm 24 is attached to the magnetic sensor unit 30.

Figure 2:
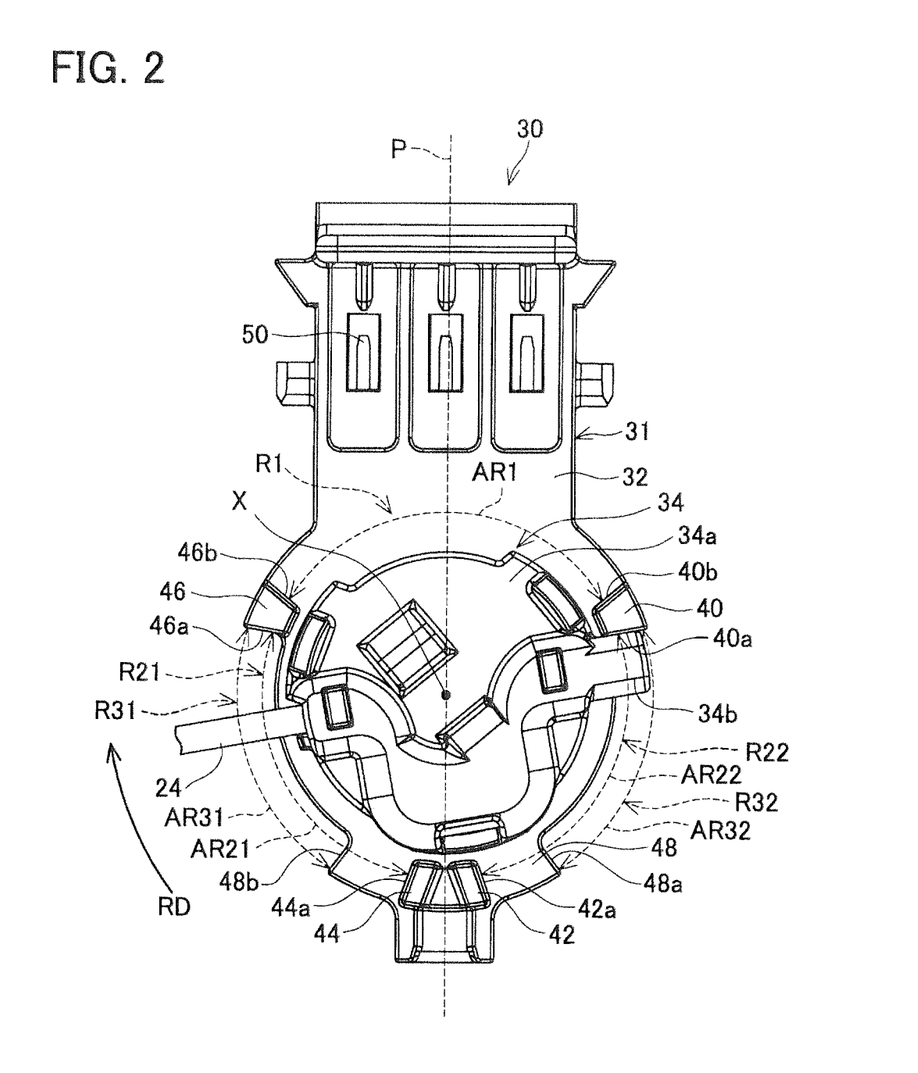
FIG. 2 is a front view of a magnetic sensor unit.
Figure 3:
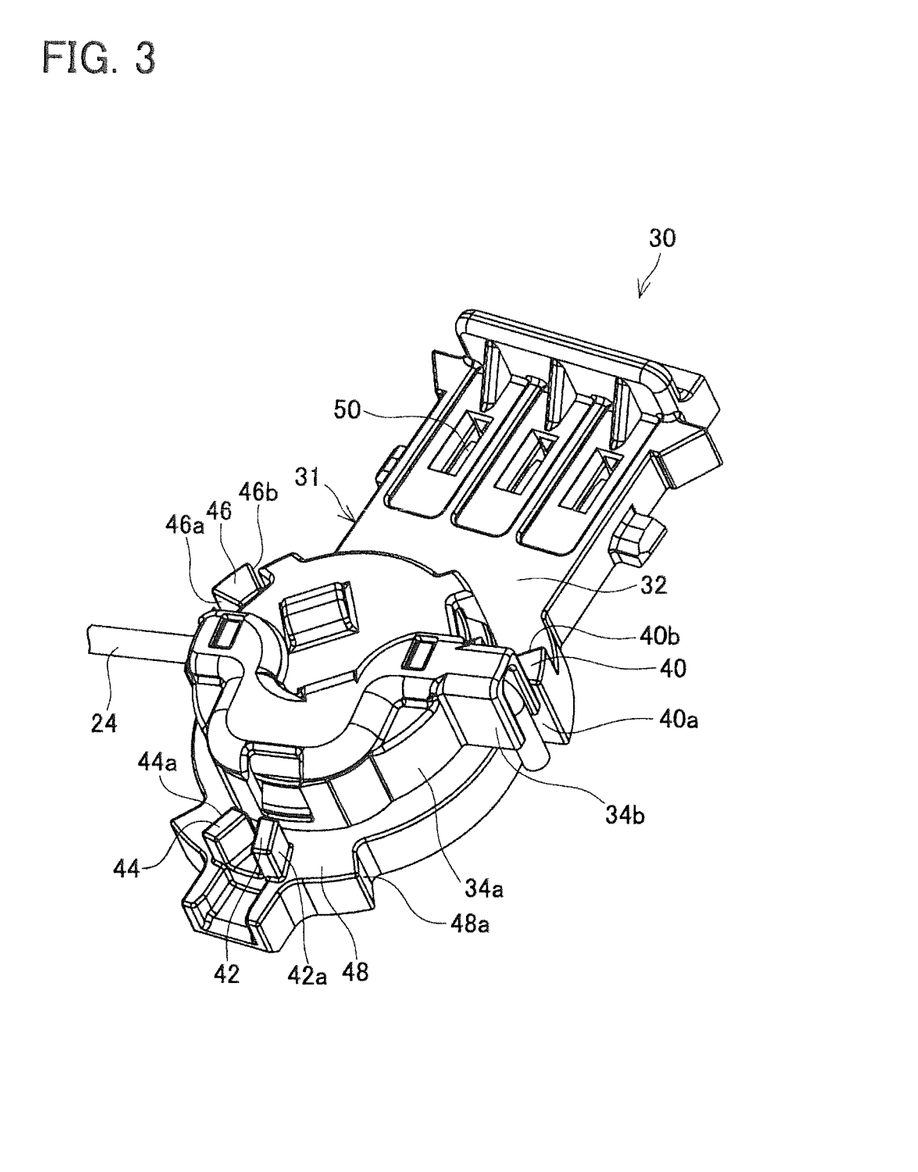
FIG. 3 is a perspective view of the magnetic sensor unit.

As shown in FIGS. 2 and 3, the magnetic sensor unit 30 supports the arm 24 to be rotatable relative to the fuel pump unit 12. The magnetic sensor unit 30 includes a supporting member 31; a magnet (not illustrated), and a magnetic sensor 50. In FIGS. 2 to 7, only a portion of the arm 24 in the vicinity of the magnetic sensor unit 30 is illustrated.

The supporting member 31 is made of resin (e.g. epoxy resin). The supporting member 31 includes a body 32 and a holder 34. The holder 34 is attached to the base end of the arm 24. The holder 34 is fixed to the arm 24. The holder 34 holds a magnet (not illustrated).

The holder 34 is rotatably supported by the body 32. The holder 34 is attached to the body 32 in any of the positions shown in FIGS. 2, 5, and 6. The holder 34 axially rotates on a rotation center X. This causes the arm 24 to rotate with respect to the body 32 with the rotation center X as a fulcrum. The holder 34 and the magnet held by the holder 34 rotate along with the rotation of the arm 24. A center of the magnet coincides with the rotation center X. It should be noted that a plane including a range of movement within which a central axis of the arm 24 moves when the arm 24 rotates is hereinafter sometimes referred to as "rotation plane". The holder 34 includes a main body 34a and a contact portion 34b.

The main body 34a has a cylindrical shape having one end closed. The contact portion 34b protrudes from an outer periphery of the main body 34a toward outside.

The body 32 houses the magnetic sensor 50. The magnetic sensor 50 is disposed at the back (i.e., the fuel pump unit 12 side) of the magnet supported by the holder 34. The body 32 is fixed to the magnetic sensor 50, and the arm 24 and the holder 34 are rotatable with respect to the magnetic sensor 50. For this reason, the magnet which is fixed to the holder 34 is rotatable with respect to the magnetic sensor 50.

The magnetic sensor 50 detects a rotary motion of the arm 24. Based on a result of the detection, the magnetic sensor 50 outputs, to a fuel meter (not illustrated), a signal representing an analog quantity corresponding to the amount of the fuel stored in the fuel tank 4 (see FIG. 1). Examples of the signal representing the analog quantity include an analog voltage signal, a signal based on PWM (which stands for "pulse width modulation"), a signal that is sent by digital communication such as CAN (which stands for "controller area network") or LAN (which stands for "local area network), etc. The magnetic sensor 50 is a magnetic sensor configured to detect a rotation angle of the arm 24, and a usable example of the magnetic sensor 50 is a publicly-known sensor using a Hall IC. Specifically, the magnetic sensor 50 has a Hall element configured to detect the orientation of a magnetic field of a magnet. The magnetic sensor 50 is covered with the body 32 so as not to be exposed to outside.

The three lead wires of the magnetic sensor 50 are connected to a power supply line 52, an output line 54, and a ground line 56, respectively (see FIG. 1). The power supply line 52, the output line 54, and the ground line 56 are connected to the fuel meter through the set plate 6.

The body 32 is fixed to an outer wall of the fuel pump unit 12. The body 32 includes stoppers 40, 42, 44, 46, and 48. The stoppers 40, 42, 44, and 46 protrude from a front surface of the body 32 to a side on which the holder 34 is disposed. The stoppers 40, 42, 44, and 46 are disposed in positions distant from the outer periphery of the main body 34a of the body 34. The stopper 48 is disposed at a lower end of the body 32.

The stopper 40 has a partially annular shape extending along a rotation direction RD of the arm 24. The stopper 40 includes contact faces 40a and 40b at both ends in the rotation direction RD, respectively. As shown in FIG. 3, the contact face 40a extends in the form of a plane from one end of the stopper 40 (i.e. the end of the stopper 40 on a back surface side of the body 32) to the other end of the stopper 40 (i.e. the end of the stopper 40 that protrudes from the front surface of the body 32). The contact face 40b extends in the form of a plane from the front surface of the body 32 to the other end of the stopper 40.

The stopper 46 and the stopper 40 are disposed in plane symmetry with respect to a plane P encompassing the rotation center X and orthogonal to a rotation plane. The stopper 46 includes contact faces 46a and 46b at both ends in the rotation direction RD, respectively. The contact face 46a and the contact face 40a are in plane symmetry with respect to the plane P, and the contact face 46b and the contact face 40b are in plane symmetry with respect to the plane P.

The stopper 48 has a partially annular shape extending along the rotation direction RD of the arm 24. A thickness of the stopper 48 is identical to a thickness of the body 32 from the front surface to the back surface. The stopper 48 includes contact faces 48a and 48b at both ends in the rotation direction RD, respectively. As shown in FIG. 3, the contact face 48a extends in the form of a plane from one end of the stopper 48 (i.e. the end of the stopper 48 on the back surface side of the body 32) to the other end of the stopper 48 (i.e. the end of the stopper 48 on a front surface side of the body 32). The contact face 48a and the contact face 40a are disposed at a distance from each other in the rotation direction RD. Similarly, the contact face 48b, too, extends from the one end of the stopper 48 to the other end of the stopper 48. The contact face 48b and the contact face 48a are disposed in plane symmetry with respect to the plane P. For this reason, the distance between the contact face 48b and the contact face 46a along the rotation direction RD is equal to the distance between the contact face 48a and the contact face 40a along the rotation direction RD.

The stopper 42 protrudes from a front surface of the stopper 48. That is, the stopper 42 is disposed in a different position with respect to the stopper 48 in a direction perpendicular to the rotation plane of the arm 24. The stopper 42 is at a distance from the stopper 40 in the rotation direction RD. The stopper 42 has a partially annular shape extending along the rotation direction RD. The stopper 42 includes a contact face 42a at an end thereof on a stopper 40 side in the rotation direction RD. The contact face 42a extends in the form of a plane from the front surface of the body 32 to a leading end of the stopper 42 (i.e. an end of the stopper 42 that protrudes from the front surface of the body 32). The distance between the contact face 42a and the contact face 40a along the rotation direction RD is longer than the distance between the contact face 48a and the contact face 40a along the rotation direction RD.

The stopper 44 and the stopper 42 are disposed in plane symmetry with respect to the plane P. That is, the stopper 44 is disposed in a different position with respect to the stopper 48 in a direction perpendicular to the rotation plane of the arm 24. The stopper 44 includes a contact face 44a at an end thereof on a stopper 46 side in the rotation direction RD. The contact face 44a and the contact face 42a are disposed in plane symmetry with respect to the plane P. For this reason, the distance between the contact face 44a and the contact face 46a along the rotation direction RD is equal to the distance between the contact face 42a and the contact face 40a along the rotation direction RD. Further, the distance between the contact face 44a and the contact face 46a along the rotation direction RD is longer than the distance between the contact face 48b and the contact face 46a along the rotation direction RD.

The five stoppers 40, 42, 44, 46, and 48 define five rotation regulators R1, R21, R22, R31, and R32. In other words, the body 32 includes the five rotation regulators R1, R21, R22, R31, and R32.

Figure 5:
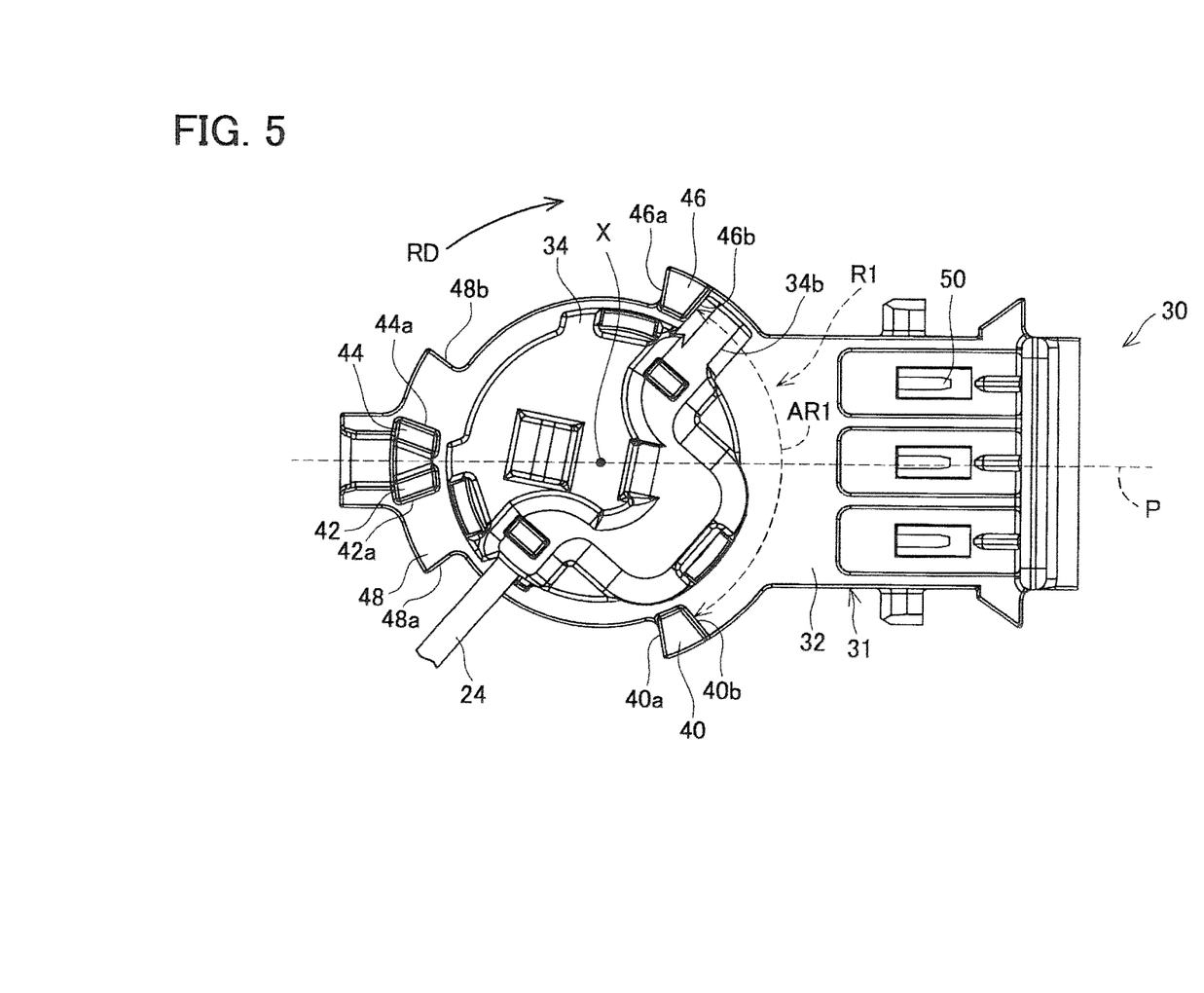
FIG. 5 is a front view of the magnetic sensor unit of the first embodiment with a different attachment position of the holder with respect to the body.

The rotation regulator R1 includes a pair of the stoppers 40 and 46. In a case where, as shown in FIG. 5, the holder 34 is attached to the body 32 and the contact portion 34b is located between the stopper 40 and the stopper 46, the contact portion 34b is capable of contacting both the contact face 40b of the stopper 40 and the contact face 46b of the stopper 46. That is, the holder 34 is supported by the body 32 in a state where a rotation angle range of the holder 34 is being regulated by the rotation regulator R1. In a state shown in FIG. 5, the body 32 is attached to the fuel pump unit 12 in a state where the body 32 has been rotated 90 degrees with respect to states shown in FIGS. 1 to 3. In this configuration, the arm 24 is rotatable between a position at which the contact portion 34b contacts the contact face 40b and a position at which the contact portion 34b contacts the contact face 46b. As a result of this, a rotation angle of the arm 24 is regulated to a rotation angle range AR1 by the rotation regulator R1.

As shown in FIG. 2, the rotation regulator R32 includes a pair of the stoppers 40 and 48. In a case where the holder 34 is attached to the body 32 and the contact portion 34b is located between the stopper 40 and the stopper 48, the contact portion 34b is capable of contacting the contact face 40a of the stopper 40. Further, as shown in FIG. 3, causing the arm 24 to protrude from the contact portion 34b beyond the front surface of the body 32 enables the arm 24 to contact the contact face 48a of the stopper 48. In this configuration, as shown in FIG. 2, the arm 24 is rotatable between a position at which the contact portion 34b contacts the contact face 40a and a position at which the arm 24 contacts the contact face 48a. That is, the holder 34 is supported by the body 32 in a state where the rotation angle range of the holder 34 is being regulated by the rotation regulator R32. As a result of this, the rotation angle of the arm 24 is regulated to a rotation angle range AR32 by the rotation regulator R32.

Figure 4:
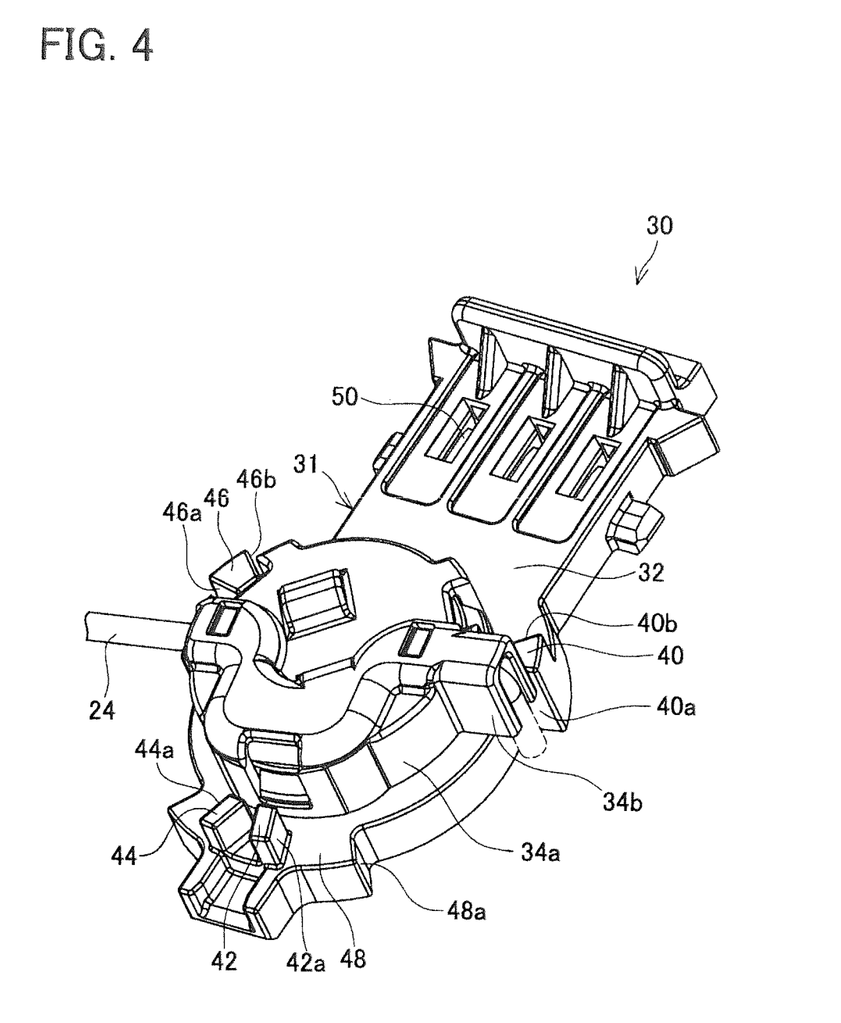
FIG. 4 is a perspective view of a magnetic sensor unit of a first embodiment having different rotation angle ranges of an arm.

The rotation regulator R22 includes a pair of the stoppers 40 and 42. In a case where, as shown in FIG. 4, the holder 34 is attached to the body 32 and the contact portion 34b is located between the stopper 40 and the stopper 42, the contact portion 34b is capable of contacting the contact face 40a of the stopper 40. Further, in a case where the arm 24 does not protrude from the contact portion 34b beyond the front surface of the body 32, the arm 24 does not contact the contact face 48a of the stopper 48. For this reason, the contact portion 34b is rotatable to the stopper 42 beyond the stopper 48. In this case, the contact portion 34b is capable of contacting the contact face 42a of the stopper 42. In this configuration, as shown in FIG. 2, the arm 24 is rotatable between the position at which the contact portion 34b contacts the contact face 40a and a position at which the contact portion 34b contacts the contact face 42a. That is, the holder 34 is supported by the body 32 in a state where the rotation angle range of the holder 34 is being regulated by the rotation regulator R22. As a result of this, the rotation angle of the arm 24 is regulated to a rotation angle range AR22 by the rotation regulator R22.

Figure 6:
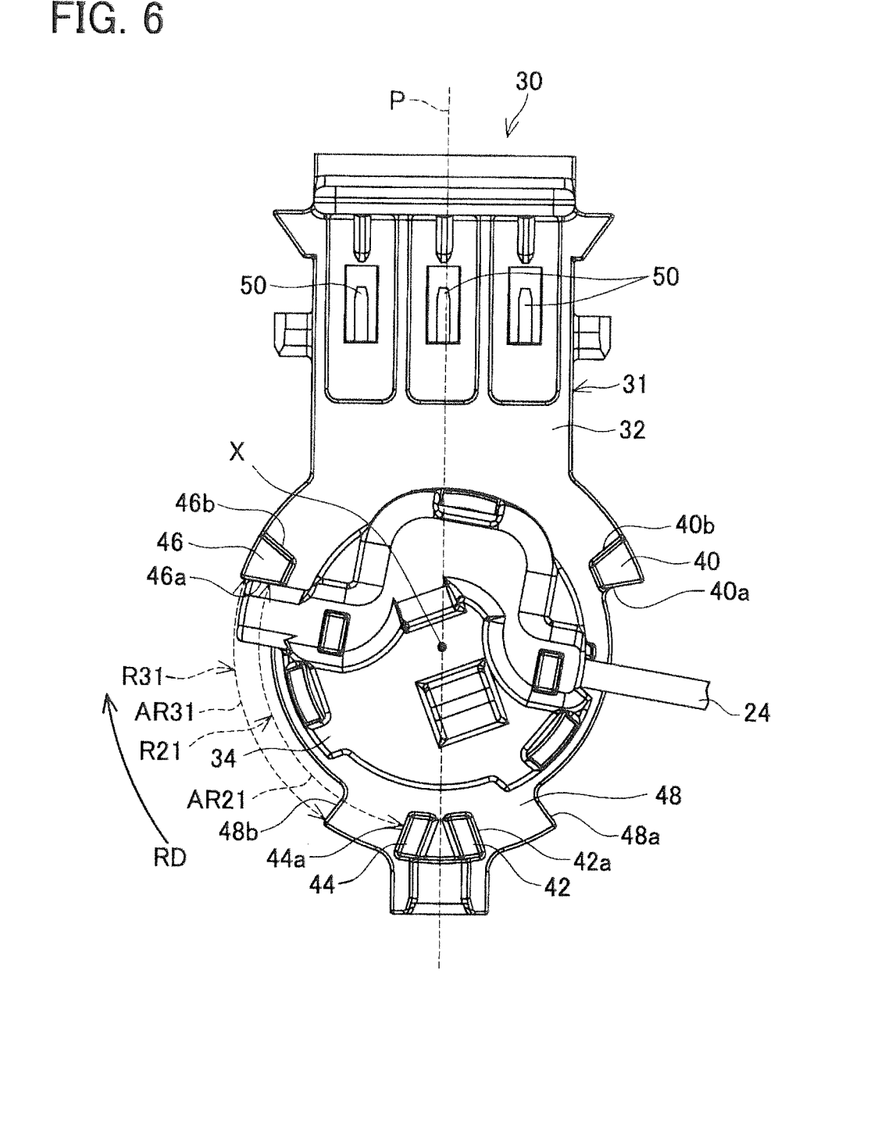
FIG. 6 is a front view of the magnetic sensor unit of the first embodiment with a different attachment position of the holder with respect to the body.

The rotation regulator R31 includes a pair of the stoppers 46 and 48. The rotation regulator R31 and the rotation regulator R32 are disposed in plane symmetry with respect to the plane P. In a case where, as shown in FIG. 6, the holder 34 is attached to the body 32 and the contact portion 34b is located between the stopper 46 and the stopper 48, the contact portion 34b is capable of contacting the contact face 46a of the stopper 46. As compared with a state where the holder 34 is so attached that the rotation of the arm 24 is regulated by the rotation regulator R32, the holder 34 is attached in plane symmetry with respect to the plane P.

Further, as in the case where the rotation of the arm 24 is regulated by the rotation regulator R32 (see FIG. 3), causing the arm 24 to protrude from the contact portion 34b beyond the front surface of the body 32 enables the arm 24 to contact the contact face 48b of the stopper 48. In this configuration, the arm 24 is rotatable between a position at which the contact portion 34b contacts the contact face 46a and a position at which the arm 24 contacts the contact face 48b. That is, the holder 34 is supported by the body 32 in a state where the rotation angle range of the holder 34 is being regulated by the rotation regulator R31. As a result of this, the rotation angle of the arm 24 is regulated to a rotation angle range AR31 by the rotation regulator R31.

The rotation regulator R21 includes a pair of the stoppers 44 and 46. The rotation regulator R21 and the rotation regulator R22 are disposed in plane symmetry with respect to the plane P. In a case where, as shown in FIG. 6, the holder 34 is attached to the body 32 and the contact portion 34b is located between the stopper 44 and the stopper 46, the contact portion 34b is capable of contacting the contact face 46a of the stopper 46. As compared with a state where the holder 34 is so attached that the rotation of the arm 24 is regulated by the rotation regulator R22, the holder 34 is attached in plane symmetry with respect to the plane P.

As in the case where the rotation of the arm 24 is regulated by the rotation regulator R22 (see FIG. 4), in a case where the arm 24 does not protrude from the contact portion 34b beyond the front surface of the body 32, the contact portion 34b is rotatable to the stopper 44 beyond the stopper 48. In this case, the contact portion 34b is capable of contacting the contact face 44a of the stopper 44. In this configuration, the arm 24 is rotatable between the position at which the contact portion 34b contacts the contact face 46a and a position at which the contact portion 34b contacts the contact face 44a. That is, the holder 34 is supported by the body 32 in a state where the rotation angle range of the holder 34 is being regulated by the rotation regulator R21. As a result of this, the rotation angle of the arm 24 is regulated to a rotation angle range AR21 by the rotation regulator R21. It should be noted that in a case where the contact portion 34b contacts each of the contact faces 40a, 40b, 42a, 44a, 46a, 46b, 48a, and 48b of the stoppers 40, 42, 44, 46, and 48, the contact portion 34b is in surface contact with each of the contact faces 40a, 40b, 42a, 44a, 46a, 46b, 48a, and 48b.

Liquid Amount Detection Method

Next, a liquid amount detection method is described. In the fuel amount detector 20, the holder 34 is supported by the body 32 in a state where the rotation angle range of the arm 24 is being regulated by any of the rotation regulators R1, R21, R22, R31, and R32. While the vehicle is being operated (i.e. while the engine is being driven), the magnetic sensor 50 outputs a signal corresponding to the orientation of a magnetic field of the magnet. Examples of the signal include an analog voltage signal, a signal based on PWM (which stands for "pulse width modulation"), a signal that is sent by digital communication such as CAN (which stands for "controller area network") or LAN (which stands for "local area network), etc. When the height of the liquid level of the fuel in the fuel tank 4 changes, the float 22 moves in an up-and-down direction, and the arm 24 rotates in accordance with the movement of the float 22 in the up-and-down direction. As a result of this, the magnet axially rotates along with the rotation of the arm 24. This causes the orientation of the magnetic field of the magnet to vary in accordance with the rotation of the arm 24, i.e. in accordance with the height of the liquid level of the fuel in the fuel tank 4. The magnetic sensor 50 detects a rotary motion of the arm 24. Based on a result of the detection, the magnetic sensor 50 outputs, to the fuel meter, a signal corresponding to the amount of the fuel stored in the fuel tank 4. Upon receiving the signal outputted from the magnetic sensor 50, an external CPU (not illustrated) determines the amount of the fuel stored in the fuel tank 4 and causes an indicator to indicate the fuel amount thus determined.

Effects of the Present Embodiment

None of the rotation regulators R1, R21, R22, R31, and R32 has a wall surface formed at an outer peripheral edge thereof. In particular, the rotation regulators R21, R22, R31, and R32 are open to outside of the body 32 over the entire rotation angle ranges AR21, AR22, AR31, and AR32. Particularly, the rotation regulators R21, R22, R31, and R32 are not closed by the body 32, and the rotation regulators R21, R22, R31, and R32 are located at an outer peripheral end of the body 32. This configuration makes it possible to reduce the size of the body 32. Further, in the rotation angle ranges AR31 and AR32 of the rotation regulators R31 and R32, the outer peripheral end of the body 32 is located inside of the rotation regulators R31 and R32. For this reason, in the rotation angle ranges AR31 and AR32, the rotation regulators R31 and R32 are open in a direction from the front surface of the body 32 to the back surface of the body 32. This configuration makes it possible to further reduce the size of the body 32. Further, parts of both ends of the rotation regulator R1 are located at the outer peripheral end of the body 32. This configuration makes it possible to reduce the size of the body 32.

Further, in the rotation direction RD, one end of the rotation angle range AR21 that is regulated by the rotation regulator R21 is disposed in the same position as one end of the rotation angle range AR31 that is regulated by the rotation regulator R31, and the other end of the rotation angle range AR21 is disposed in a position more distant from the one end of the rotation angle range AR21 than the other end of the rotation angle range AR31. That is, a part of the rotation angle range AR21 overlaps the entire rotation angle range AR31. A relationship between the rotation angle range AR22 that is regulated by the rotation regulator R22 and the rotation angle range AR32 that is regulated by the rotation regulator R32 is the same as a relationship between the rotation angle range AR21 and the rotation angle range AR31. This configuration makes it possible to make the sum of the rotation angle ranges AR1, AR21, AR22, and AR31 larger than the sum of rotation angle ranges of a plurality of rotation regulators disposed on a single body 32 without an overlap between the rotation angle ranges.

Further, the rotation regulator R1 does not overlap the rotation regulators R21, R22, R31, and R32 in the rotation direction RD. This makes it possible to restrict the body 32 from being enlarged in a thickness direction.

Of the rotation angle ranges AR1, AR21, AR22, AR 31, and AR32, the rotation angle range AR1, which is regulated by the rotation regulator R1, is largest, the rotation angle ranges AR21 and AR22 are second largest, and the rotation angle ranges AR31 and AR32 are smallest. The rotation angle ranges AR21 and AR22 are equal to each other, and the rotation angle ranges AR31 and AR32 are equal to each other. This configuration makes it possible to define three different types of rotation angle ranges and the rotation angle ranges are different among the three different types of rotation angle ranges.

The rotation regulator R21 and the rotation regulator R31 are disposed in plane symmetry with respect to the plane P. This configuration makes it possible to, without changing the rotation angle range of the arm 24, choose between a state where the arm 24 is so attached to the body 32 that, as shown in FIG. 2, the arm 24 extends leftward with respect to the body 32 and a state where the arm 24 is so attached to the body 32 that the arm 24 extends rightward with respect to the body 32. This configuration makes it possible to attach the arm 24 to the body 32 in consideration of the shape of the fuel tank 4, the workability of attachment, etc.

Further, when the arm 24 rotates in accordance with a change in height of the liquid level, the contact portion 34b or the arm 24 contacts any of the stoppers 40, 42, 44, 46, and 48, whereby the rotation of the arm 24 is stopped. This configuration makes it possible to appropriately regulate the rotation of the arm 24.

Second Embodiment

Figure 7:
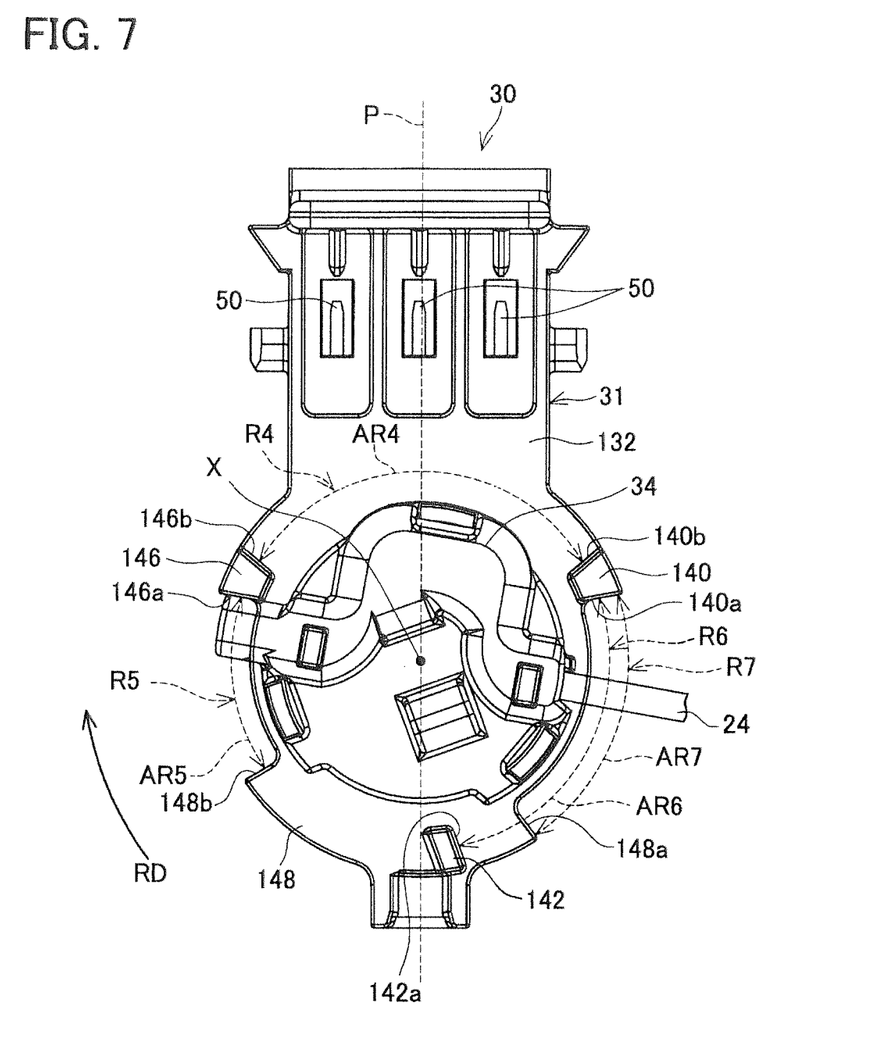
FIG. 7 is a front view of a magnetic sensor unit of a second embodiment.

Points of difference from the first embodiment are described with reference to FIG. 7. In the present embodiment, the shape of a body 132 is different from the shape of the body 32 of the first embodiment. The body 132 includes four rotation regulators R4, R5, R6, and R7. The rotation regulators R4, R6, and R7 are the same as the rotation regulators R1, R22, and R32, respectively. Stoppers 140, 142, 146, and 148 are the same as the stoppers 40, 42, 46, and 48 of the first embodiment, respectively.

The rotation regulator R4 includes the stoppers 140 and 146. The rotation regulator R6 includes the stoppers 140 and 142. The rotation regulator R7 includes the stoppers 140 and 148.

The rotation regulator R5 includes a pair of the stoppers 146 and 148. In a case where a holder 134 that is the same as the holder 34 is attached to the body 132 and a contact portion 134b that is the same as the contact portion 34b is located between the stopper 146 and the stopper 148, the contact portion 134b is capable of contacting a contact face 146a of the stopper 146. Further, causing an arm 124 that is the same as the arm 24 to protrude from the contact portion 134b beyond a front surface of the body 132 enables the arm 124 to contact a contact face 148b of the stopper 148. In this configuration, the arm 124 is rotatable between a position at which the contact portion 134b contacts the contact face 146a and a position at which the arm 124 contacts the contact face 148b. That is, the holder 34 is supported by the body 132 in a state where a rotation angle range of the holder 34 is being regulated by the rotation regulator R5. As a result of this, a rotation angle of the arm 124 is regulated to a rotation angle range AR5 by the rotation regulator R5.

Of the rotation angle ranges AR4 to AR7, the rotation angle range AR4, which is regulated by the rotation regulator R4, is largest, the rotation angle ranges AR6 and AR7 are smaller in this order, and the rotation angle ranges AR5 is smallest. This configuration makes it possible to define four different types of rotation angle ranges.

The art disclosed in the embodiment, the numbers of rotation regulators of the bodies 32 and 132 are not limited to the numbers described above in the respective embodiments. The body 32 may include two or three rotation regulators, or may include six or more rotation regulators.

Further, the body 32 does not need to include rotation regulators (e.g. the rotation regulators R21 and R31) whose rotation angle ranges overlap each other in the rotation direction of the arm 24. For example, the body 32 may include the rotation regulators R1, R21, and R22 and does not need to include the rotation regulators R31 and R32.

Further, the rotation angle range AR31 of the rotation regulator R31 entirely overlaps the rotation angle range AR21 of the rotation regulator R21. Alternatively, the rotation angle range AR31 of the rotation regulator R31 may partially overlap the rotation angle range AR21 of the rotation regulator R21.

In the embodiment described above, in a case where, as shown in FIG. 5, the holder 34 is attached to the body 32 and the contact portion 34b is located between the stopper 40 and the stopper 46, the body 32 is attached to the fuel pump unit 12 in a state where the body 32 has been rotated 90 degrees with respect to the states shown in FIGS. 1 to 3. Alternatively, in a case where the holder 34 is attached to the body 32 and the contact portion 34b is located between the stopper 40 and the stopper 46, the body 32 may be attached to the fuel pump unit 12 without being rotated 90 degrees with respect to the states shown in FIGS. 1 to 3. For example, the body 32 may be attached to the fuel pump unit 12 in a state where the body 32 has been rotated R degrees (0≤R<90) with respect to the states shown in FIGS. 1 to 3. In this case, a direction in which the arm 24 extends may be changed by bending the arm 24 in conformity with the shape of the fuel tank 4 or the like.

Further, the "liquid level detector" of the present specification may be a detector configured to detect an amount of liquid in a container such as an amount of water stored in a water storage tank, other than the fuel amount detector 20 configured to detect the amount of the fuel in the fuel tank 4.

Further, in the embodiment described above, the magnetic sensor 50 outputs, to the fuel meter, a signal concerning an analog quantity corresponding to the amount of the fuel stored in the fuel tank 4. However, the magnetic sensor 50 may detect a rotary motion of the arm 24 and, based on a result of the detection, output, to the fuel meter, a signal corresponding to the height of the liquid level of the fuel stored in the fuel tank 4. In this case, upon receiving the signal outputted from the magnetic sensor 50, the external CPU may determine the height of the liquid level of the fuel stored in the fuel tank 4 and cause the indicator to indicate the height of the liquid level thus determined.

What is claimed is:
1. A liquid level detector comprising:
   a float;
   an arm attached to the float and configured to convert a linear motion of the float in an up-and-down direction to a rotary motion;
   a holder fixed to the arm; and
   a body rotatably supporting the holder,
   wherein the body comprises a plurality of rotation regulators including a first rotation regulator and a second rotation regulator, the first rotation regulator configured to regulate a rotation angle range of the arm to a first range and the second rotation regulator configured to regulate the rotation angle range of the arm to a second range,
   the holder is supported by the body in a state where the rotation angle range of the arm is regulated by one of the plurality of rotation regulators,
   the rotation angle range of the first range is different from the rotation angle range of the second range, the first range and the second range do not overlap each other in a rotation direction of the arm, each of the plurality of rotation regulators comprises a pair of stoppers disposed separately from each other in the rotation direction of the arm, and at least a part of area between the pair of stoppers of the each of the plurality of rotation regulators is open to outside of the body, each of the stoppers is configured to stop the arm from rotating with respect to the body by contacting at least one of the arm and a contact portion of the holder, and at least one of the stoppers is configured to stop the arm from rotating with respect to the body by contacting the contact portion.

2. The liquid level detector as in claim 1, wherein the plurality of rotation regulators further includes a third rotation regulator configured to regulate the rotation angle range of the arm to a third range, the rotation angle range of the third range is different from the rotation angle range of the first range, and at least a part of the third range overlaps at least a part of the first range in the rotation direction of the arm.

3. The liquid level detector as in claim 2, wherein the plurality of rotation regulators further includes a fourth rotation regulator configured to regulate the rotation angle range of the arm to a fourth range, the fourth rotation regulator and the first rotation regulator are disposed in plane symmetry with respect to a plane encompassing a rotation center of the arm and orthogonal to a rotation plane.

4. The liquid level detector as in any claim 2, wherein one of the pair of stoppers of the first rotation regulator is disposed at the same position as one of the pair of stoppers of the third rotation regulator in the rotation direction of the arm.

5. The liquid level detector as in claim 1, wherein at least one of the stoppers protrudes from a front surface of the body to a side on which the holder is disposed.

6. The liquid level detector as in claim 1, further comprising:

a sensor configured to detect a rotary motion of the arm, wherein the body houses the sensor.

7. The liquid level detector as in claim 1, wherein the plurality of rotation regulators further includes a specific rotation regulator configured to regulate the rotation angle range of the arm to a specific range, the specific rotation regulator and the first rotation regulator are disposed in plane symmetry with respect to a plane encompassing a rotation center of the arm and orthogonal to a rotation plane.

8. The liquid level detector as in claim 1, wherein the holder is disposed on a surface of the body, the contact portion of the holder protrudes outward of the holder at the same side of the holder respect to the surface of the body, the plurality of rotation regulators further includes a specific rotation regulator configured to regulate the rotation angle range of the arm to a specific range, a pair of stoppers of the specific rotation regulator is disposed at the same side of the holder respect to the surface of the body, the pair of stoppers of the first rotation regulator is disposed at an opposite side to the holder respect to the body, the rotation angle range of the specific range is smaller than the rotation angle range of the first range, the specific range overlaps the first range in the rotation direction of the arm along with a rotation axis direction of the arm, in a case where the arm protrudes from the contact portion of the holder toward the opposite side to the holder respect to the body beyond the surface of the body, the arm is able to contact to at least one of the pair of stoppers of the specific rotation regulator, and in a case where the arm does not protrude from the contact portion of the holder toward the opposite side to the holder respect to the body beyond the surface of the body, the contact portion of the holder is able to contact the pair of stoppers of the first rotation regulator.

* * * * *